US010860593B1

(12) United States Patent
Ross et al.

(10) Patent No.: US 10,860,593 B1
(45) Date of Patent: Dec. 8, 2020

(54) METHODS AND SYSTEMS FOR RANKING LEADS BASED ON GIVEN CHARACTERISTICS

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 16/506,954

(22) Filed: Jul. 9, 2019

Related U.S. Application Data

(63) Continuation of application No. 16/167,212, filed on Oct. 22, 2018, now Pat. No. 10,394,834, which is a continuation of application No. 14/576,774, filed on Dec. 19, 2014, now Pat. No. 10,242,068.

(60) Provisional application No. 61/922,134, filed on Dec. 31, 2013.

(51) Int. Cl.
*G06F 16/00* (2019.01)
*G06F 16/2457* (2019.01)
(Continued)

(52) U.S. Cl.
CPC ........ *G06F 16/24578* (2019.01); *G06F 3/048* (2013.01); *G06F 7/00* (2013.01); *G06Q 10/063* (2013.01); *G06Q 30/0201* (2013.01)

(58) Field of Classification Search
None
See application file for complete search history.

(56) References Cited

U.S. PATENT DOCUMENTS 5,519,773 A 5/1996 Dumas et al.
6,185,558 B1 2/2001 Bowman et al.
(Continued)

FOREIGN PATENT DOCUMENTS

EP 2109302 B1 9/2010
WO 2007112411 A2 10/2007
WO 2009065052 A1 5/2009

OTHER PUBLICATIONS

Sara Costa, "Call Flow—Talkdesk Support", <https://support.talkdesk.com/hc/en-us/articles/206196766-Call-Flow>, Jan. 18, 2018, 6 pages.
(Continued)

*Primary Examiner* — Gurkanwaljit Singh
(74) *Attorney, Agent, or Firm* — Foley & Lardner LLP

(57) ABSTRACT

Systems and methods for ranking and appraising leads according to their quality are disclosed. The disclosed method operates within a systems' architecture configured to rank and auction leads. One or more client computing devices allow an agent to request for the ranking and appraisal of a set of leads. Following the request, a ranking module implements one or more software modules for assessing the quality of each lead and ranks the set of leads according to a quality criterion. Next, a price modeling module defines a floor price for the set of leads. The solutions derived from the software modules are stored in an internal database where they are available to other software modules operating within the system architecture for ranking and auction leads. In some embodiments, the ranking results are used for tracking results and developing insight about the value of leads and the effectiveness of the ranking method.

20 Claims, 6 Drawing Sheets

(51) Int. Cl.
*G06Q 30/02* (2012.01)
*G06F 7/00* (2006.01)
*G06Q 10/06* (2012.01)
*G06F 3/048* (2013.01)

(56) References Cited

U.S. PATENT DOCUMENTS

| | | | |
|---|---|---|---|
| 6,236,977 B1 * | 5/2001 | Verba | G06Q 30/02 705/14.39 |
| 6,611,590 B1 | 8/2003 | Lu et al. | |
| 6,862,574 B1 | 3/2005 | Srikant et al. | |
| 6,879,683 B1 | 4/2005 | Fain et al. | |
| 6,970,554 B1 | 11/2005 | Peterson et al. | |
| 6,975,720 B1 | 12/2005 | Crook | |
| 7,023,979 B1 | 4/2006 | Wu et al. | |
| 7,035,811 B2 | 4/2006 | Gorenstein | |
| 7,047,206 B1 * | 5/2006 | Schultze | G06Q 10/06311 705/7.15 |
| 7,085,740 B1 | 8/2006 | Meyers | |
| 7,228,284 B1 * | 6/2007 | Vaillancourt | G06Q 10/063 705/7.13 |
| 7,275,083 B1 | 9/2007 | Seibel et al. | |
| 7,340,410 B1 * | 3/2008 | Vaillancourt | G06Q 10/063114 705/7.15 |
| 7,580,870 B1 | 8/2009 | Chang | |
| 8,355,934 B2 | 1/2013 | Virdhagriswaran | |
| 8,515,736 B1 | 8/2013 | Duta | |
| 8,548,843 B2 | 10/2013 | Folk et al. | |
| 8,571,951 B2 * | 10/2013 | Diana | G06Q 30/08 705/35 |
| 8,577,014 B2 | 11/2013 | Brandt et al. | |
| 8,582,750 B2 | 11/2013 | Lee et al. | |
| 8,781,092 B2 | 7/2014 | Noble, Jr. | |
| 8,805,734 B2 * | 8/2014 | Diana | G06Q 30/08 705/37 |
| 9,160,851 B2 | 10/2015 | Kugler et al. | |
| 9,263,038 B2 | 2/2016 | Flaks et al. | |
| 9,582,786 B2 | 2/2017 | Gubin et al. | |
| 9,635,181 B1 | 4/2017 | McGann et al. | |
| 9,680,996 B2 | 6/2017 | Kumar et al. | |
| 9,911,131 B1 | 3/2018 | Ross et al. | |
| 9,916,538 B2 * | 3/2018 | Zadeh | G06N 7/005 |
| 10,242,068 B1 | 3/2019 | Ross et al. | |
| 2002/0035504 A1 * | 3/2002 | Dyer | G06Q 10/06311 705/7.26 |
| 2002/0082892 A1 * | 6/2002 | Raffel | G06Q 10/063118 705/7.26 |
| 2002/0128885 A1 | 9/2002 | Evans | |
| 2002/0138492 A1 | 9/2002 | Kil | |
| 2004/0081311 A1 | 4/2004 | Thompson | |
| 2004/0143473 A1 * | 7/2004 | Tivey | G06Q 10/063112 705/1.1 |
| 2004/0143476 A1 * | 7/2004 | Kapadia | G06Q 30/02 705/500 |
| 2004/0143482 A1 * | 7/2004 | Tivey | G06Q 30/018 705/317 |
| 2004/0143483 A1 * | 7/2004 | Tivey | G06Q 30/02 705/500 |
| 2004/0143484 A1 * | 7/2004 | Kapadia | G06Q 30/02 705/1.1 |
| 2005/0125334 A1 * | 6/2005 | Masella | G06Q 40/02 705/38 |
| 2005/0195966 A1 | 9/2005 | Adar et al. | |
| 2006/0041500 A1 | 2/2006 | Diana et al. | |
| 2006/0155642 A1 * | 7/2006 | Pettersen | G06Q 20/10 705/39 |
| 2006/0200360 A1 | 9/2006 | Razletovskiy | |
| 2006/0229896 A1 | 10/2006 | Rosen et al. | |
| 2006/0265259 A1 * | 11/2006 | Diana | G06Q 30/08 705/35 |
| 2007/0027746 A1 * | 2/2007 | Grabowich | G06Q 30/02 705/14.4 |
| 2007/0094181 A1 | 4/2007 | Tayebnejad et al. | |
| 2007/0136164 A1 | 6/2007 | Roti et al. | |
| 2007/0174108 A1 * | 7/2007 | Monster | G06Q 10/107 705/7.32 |
| 2007/0239769 A1 | 10/2007 | Fazal et al. | |
| 2008/0120129 A1 | 5/2008 | Seubert et al. | |
| 2008/0162258 A1 | 7/2008 | Kala et al. | |
| 2008/0184270 A1 | 7/2008 | Cole et al. | |
| 2008/0201204 A1 * | 8/2008 | Rose | G06Q 10/06395 705/7.29 |
| 2008/0201205 A1 * | 8/2008 | Rose | G06Q 10/0631 705/7.13 |
| 2008/0294501 A1 | 11/2008 | Rennich | |
| 2009/0144070 A1 | 6/2009 | Psota et al. | |
| 2009/0190744 A1 | 7/2009 | Xie et al. | |
| 2009/0190745 A1 | 7/2009 | Xie et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine et al. | |
| 2010/0030578 A1 * | 2/2010 | Siddique | G06Q 10/0637 705/3 |
| 2010/0054453 A1 | 3/2010 | Stewart | |
| 2010/0114573 A1 | 5/2010 | Huang et al. | |
| 2010/0306249 A1 * | 12/2010 | Hill | G06Q 30/02 707/769 |
| 2011/0153449 A1 | 6/2011 | Hite | |
| 2011/0196776 A1 | 8/2011 | Rash et al. | |
| 2011/0225082 A1 | 9/2011 | Diana et al. | |
| 2011/0246409 A1 | 10/2011 | Mitra | |
| 2011/0258016 A1 | 10/2011 | Barak et al. | |
| 2011/0258067 A1 | 10/2011 | Rowell | |
| 2011/0307257 A1 | 12/2011 | Pereg et al. | |
| 2012/0053986 A1 | 3/2012 | Cardno et al. | |
| 2012/0066065 A1 | 3/2012 | Switzer | |
| 2012/0072232 A1 * | 3/2012 | Frankham | G16H 10/20 705/2 |
| 2012/0166445 A1 | 6/2012 | Chakrabarti et al. | |
| 2012/0203584 A1 | 8/2012 | Mishor et al. | |
| 2012/0278091 A1 | 11/2012 | Yaseen et al. | |
| 2013/0006916 A1 | 1/2013 | McBride et al. | |
| 2013/0054480 A1 | 2/2013 | Ross et al. | |
| 2013/0085805 A1 | 4/2013 | Kursar et al. | |
| 2013/0215116 A1 * | 8/2013 | Siddique | G06Q 30/0643 345/420 |
| 2013/0218634 A1 | 8/2013 | Hills et al. | |
| 2013/0236002 A1 | 9/2013 | Jennings et al. | |
| 2014/0058831 A1 | 2/2014 | Duva et al. | |
| 2014/0149178 A1 | 5/2014 | Hedges | |
| 2014/0149339 A1 | 5/2014 | Title et al. | |
| 2014/0153703 A1 | 6/2014 | Desai et al. | |
| 2014/0201126 A1 * | 7/2014 | Zadeh | G06N 7/005 706/52 |
| 2014/0229406 A1 | 8/2014 | Puzis et al. | |
| 2014/0279722 A1 | 9/2014 | Singh et al. | |
| 2014/0289005 A1 | 9/2014 | Laing et al. | |
| 2014/0324529 A1 | 10/2014 | Bliss | |
| 2015/0046219 A1 | 2/2015 | Shavlik | |
| 2015/0154524 A1 * | 6/2015 | Borodow | H04W 4/029 705/7.23 |
| 2016/0071117 A1 | 3/2016 | Duncan | |
| 2016/0203498 A1 | 7/2016 | Das et al. | |
| 2016/0337795 A1 | 11/2016 | Nachman et al. | |
| 2017/0124581 A1 | 5/2017 | Wilson et al. | |
| 2017/0223190 A1 | 8/2017 | Mandel et al. | |
| 2017/0243137 A1 | 8/2017 | Mandel et al. | |

OTHER PUBLICATIONS

Raquel Florez-Lopez et al., "Marketing Segmentation Through Machine Learning Models", <https://pdfs.semanticscholar.org/ef05/502e936a94cafa0037c764bfb2212f385d97.pdf>, Social Science Computer Review, Oct. 8, 2008, 22 pages.

Sanford Gayle, "The Marriage of Market Basket Analysis to Predictive Modeling", <http://ai.stanford.edu/~ronnyk/WEBKDD2000/papers/gayle.pdf>, Published 2000, 6 pages.

Carlos Guestrin, "Unsupervised learning or Clustering—K-means Gaussian mixture models", <http://www.cs.cmu.edu/~guestrin/Class/10701-S07/Slides/clustering.pdf>, Apr. 4, 2007, 67 pages.

(56) References Cited

OTHER PUBLICATIONS

YongSeog Kim, "Customer Targeting: A Neural Network Approach Guided by Genetic Algorithms", <http://citeseerx.ist.psu.edu/viewdoc/download?doi=10.1.1.2.697&rep=rep1&type=pdf>, Feb. 1, 2005, 31 pages.

Dragomir Yankov et al., "Evaluation of Explore-Exploit Policies in Multi-result Ranking Systems", <https://arxiv.org/pdf/1504.07662.pdf>, Apr. 28, 2015, 9 pages.

Golbeck, Jenifer Ann, Computing and applying trust in we-based social networks, Diss. 2005.

Wang, Jyun-Cheng et al., "Recommending trusted online auction sellers using social network analysis". Expert Systems with Applications 34.3 (2008), pp. 1666-1679.

Shi-Jen Lin, et al., Combining ranking concept and social network analysis to detect collusive groups in online auctions, Expert Systems with Applications, vol. 30, Issue 10, pp. 9079-9086.

Paula Bernier; Genesys Interactive Voice Response; <http://www.genesys.com/solutions/customer-engagement/inbound/intelligent-voice-response>, Oct. 3, 2017; 3 pages.

Paula Bernier, Genesys Speech & Text Analytics; <http://www.genesys.com/solutions/employee-engagement/workforce-optimization/workforce-planning/speech-text-analytics>, Oct. 3, 2017; 4 pages.

W. F. Cody et al., The integration of business intelligence and knowledge management; IBM Systems Journal, vol. 41, No. 4; <https://pdfs.semanticscholar.org/3803/10409dd7822c6007d5c76808b8c28698e2cd.pdf>, Jul. 12, 2002; 17 pages.

Dawn Jutla; Enabling and Measuring Electronic Customer Relationship Management Readiness; Proceedings of the 34th Hawaii International Conference on System Sciences—2001; <http://www.computer.org/csdl/proceedings/nicss/2001/0981/07/09817023.pdf>, Aug. 7, 2002; 19 pages.

Gianmario Motta et al.; Forecasting in multi-skill call centers; 2013 Fifth International Conference on Service Science and Innovation (ICSSI); <http://ieeexplore.ieee.org/abstract/document/6599389/>, Oct. 24, 2013; 7 pages.

Haipeng Shen et al.; Forecasting Time Series of Inhomogenous Poisson Processes with Application to Call Center Workforce Management; The Annals of Applied Statistics; <https://www.unc.edu/~haipeng/publication/poissonSVD.pdf>, Jul. 25, 2008; 25 pages.

Evgeny Stepanov <https://www.researchgate.net/profile/Evgeny_Stepanov> et al.; Automatic Summarization of Call-center Conversations; Conference: IEEE Automatic Speech Recognition and Understanding Workshop (ASRU 2015); <https://www.researchgate.net/publication/282976793_Automatic_Summarization_of_Call-center_Conversations>, Dec. 2015; 3 pages.

Non-Final Office Action on U.S. Appl. No. 16/125,503 dated Aug. 6, 2020.

\* cited by examiner

METHODS AND SYSTEMS FOR RANKING LEADS BASED ON GIVEN CHARACTERISTICS

CROSS-REFERENCE TO RELATED APPLICATIONS

This application is a continuation of U.S. patent application Ser. No. 16/167,212, filed on Oct. 22, 2018, which is a continuation of U.S. patent application Ser. No. 14/576,774, filed on Dec. 19, 2014, which is a non-provisional patent application that claims the benefit of U.S. Patent Provisional Application Ser. No. 61/922,134, filed Dec. 31, 2013, all of which are hereby incorporated by reference in their entirety.

This application relates to U.S. patent application Ser. No. 14/576,686, filed Dec. 19, 2014, U.S. Provisional Application Ser. No. 61/922,137, filed Dec. 31, 2013, U.S. Provisional Application No. 61/921,738, filed on Dec. 30, 2013, U.S. Provisional Application Ser. No. 61/922,132, filed Dec. 31, 2013, U.S. Patent Application Ser. No. 61/921,752, filed Dec. 30, 2013, U.S. Provisional Application No. 61/922,139, filed Dec. 31, 2013, and U.S. Provisional Patent Application Ser. No. 61/921,760, filed Dec. 30, 2013, all of which are hereby incorporated by reference in their entirety.

TECHNICAL FIELD

The present disclosure relates in general to methods and systems for lead management, and more specifically to a method and system for ranking leads.

BACKGROUND

Leads generation or acquisition is one of the most important tools for boosting sales in a company. The use of leads allows buyers to request information from businesses that offer a product or service they are interested in acquiring while enabling companies to offer their products or services to individuals with a higher propensity to close a transaction.

Although sales leads offer an opportunity to create value for a company, there are some challenges for its efficient utilization by a business. For example, when companies generate leads from a variety of sources, often the sources providing the leads do not provide enough information about the quality of the leads generated. This can result in an agent to wasting time, effort, and financial resources by establishing contact with a lead that may not be financially ready or interested in purchasing a service and/or product.

For the aforementioned reasons, there is a need for a method and system that provides a company with insight about the quality of leads so that the company can focus its efforts and resources on the most promising leads.

SUMMARY

A method for ranking and appraising leads according to their quality is disclosed. In one embodiment, a system architecture allowing the method to operate is disclosed. The system architecture includes one or more client computing devices, an analytical engine, an external data sources database, an internal database and a network connection. In this embodiment, the analytical engine is a software module implemented in one or more computing devices. Further to this embodiment, the analytical engine includes a ranking module and a price modeling module. In one embodiment, the ranking module retrieves information related to a set of leads in order to rank them based on their quality. Afterwards, the price modeling module determines a floor price based on said ranking and based on internal and external valuation information. In some embodiments, the analytical engine stores the solutions derived from the aforementioned software modules in the internal database for it to be available to other software modules operating within a systems' architecture configured to rank and auction leads. Additionally, the results stored at the internal database are employed for future analysis using a client computer device.

In one embodiment, a computer-implemented method for ranking leads, comprises collecting, by a computer, lead information related to one or more leads; classifying, by the computer, lead information into categories of lead information; receiving, by the computer, from a computer of an agent a selection of a first category of lead information and an attribute of the first category; filtering, by the computer, the lead information to obtain a set of filtered lead information comprising only the lead with the selected attribute; determining, by the computer, a set of attributes associated with the lead from the filtered lead information; assigning, by the computer, a score to each attribute associated with the lead from the filtered lead information based on a measure of how each attribute satisfies a predetermined set of criteria; calculating, by the computer, a quality score by computing the mean score for each lead based on the each scored attribute; ranking, by the computer, each lead based on the quality score; and associating, by the computer, the lead information with the ranked leads and the quality score.

In another embodiment, a system for ranking leads comprises a computer processor; a memory containing a program that, when executed by the computer processor, is configured to perform an operation comprising collecting, by the computer processor, lead information related to one or more leads; classifying, by the computer processor, lead information into categories of lead information; receiving, by the computer processor, from a computer of an agent a selection of a first category of lead information and an attribute of the first category; filtering, by the computer processor, the lead information to obtain a set of filtered lead information comprising only the lead with the selected attribute; determining, by the computer processor, a set of attributes associated with the lead from the filtered lead information; assigning, by the computer processor, a score to each attribute associated with the lead from the filtered lead information based on a measure of how each attribute satisfies a predetermined set of criteria; calculating, by the computer processor, a quality score by computing the mean score for each lead based on the each scored attribute; ranking, by the computer processor, each lead based on the quality score; and associating, by the computer processor, the lead information with the ranked leads and the quality score.

In one embodiment, a computer-implemented method for leads appraisal, comprises collecting, by a computer, lead information related to one or more leads; filtering, by the computer, the lead information to obtain a set of filtered lead information comprising a ranking associated to the one or more leads, internal valuation information, and external valuation information; determining, by the computer, one or more categories defined by the ranking associated to the one or more leads; defining, by the computer, a floor price for the set of leads associated to each rank category based on internal and external valuation information.

In another embodiment, a system for leads appraisal comprises a computer processor; a memory containing a program that, when executed by the computer processor, is configured to perform an operation comprising collecting, by the computer processor, lead information related to one or more leads; filtering, by the computer processor, the lead information to obtain a set of filtered lead information comprising a ranking associated to the one or more leads, internal valuation information, and external valuation information; determining, by the computer processor, one or more categories defined by the ranking associated to the one or more leads; defining, by the computer processor, a floor price for the set of leads associated to each rank category.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
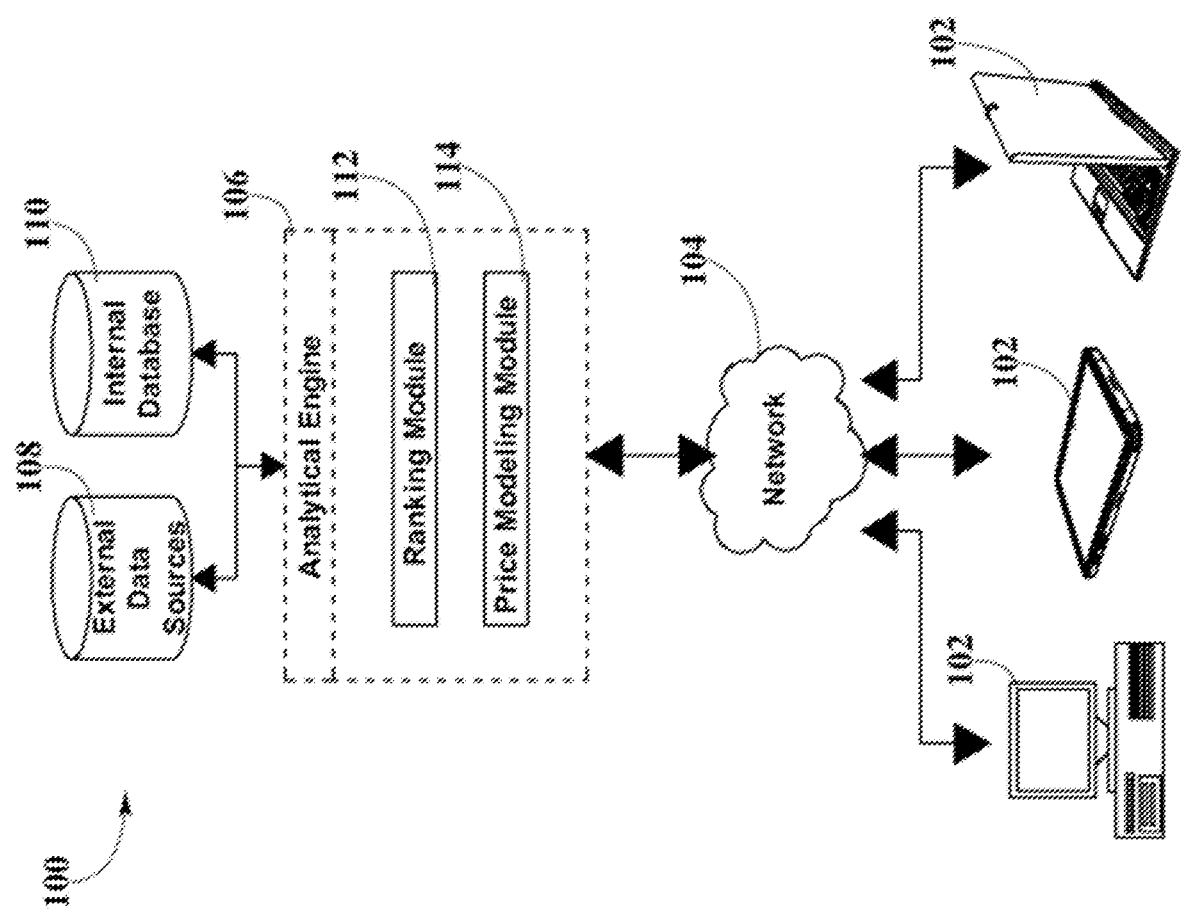
FIG. 1 is a functional block diagram illustrating a system architecture for ranking leads, according to an embodiment.

As used here, the following terms may have the following definitions:

"Leads" refers to the contact information and other information concerning an entity that may have the interest and authority to purchase a product or service.

"Agent" refers to an individual working for a company with an interest in obtaining one or more leads. An agent represents the intermediary between an issuing company and a client.

"Quality" refers to the specific attributes of a lead that that potentially creates value for a company. Examples of such attributes include the likelihood of a lead for converting into a customer and the potential profit that the transaction may generate.

"Triage" refers to classify leads into different levels of priority based on their quality.

"Ranking module" refers to a software module that handles data integration, breaking data streams into parts, executing rules, and the like. The ranking module includes relevant components for triaging and ranking leads.

DETAILED DESCRIPTION

Implementations in the present disclosure may be directed to provide a method for ranking leads according to their quality. In one implementation, a system architecture that may allow the method to operate is disclosed. The system architecture may include a client computing device, a ranking module, an external data sources database, an internal database, and a user interface connected over a network connection. The ranking module may be a software module implemented in one or more computing devices. The ranking module may include a data extraction module and a data processing module, among others. The ranking module may retrieve information related to a set of leads in order to rank them based on their quality. The ranking module may store the ranking solution in the internal database to be available to other software modules operating within a system's architecture configured to rank and auction leads. Additionally, the ranking results stored in the internal database may be employed for future analysis using a client computer device.

According to another implementation, a method for ranking leads including: a client computer device interacting with one or more customers and one or more software modules operating within a ranking module, where the ranking module may process a request for ranking a set of leads according to their quality; a data extraction module retrieving information from a database regarding a set of leads; a data processing module using one or more machine learning techniques for assessing the quality of the set of leads and performing one or more operations for ranking the set of leads according to their quality; a module manager coordinating the software modules operating within the ranking module, controlling the information flowing among the modules and storing the outcome in a database for tracking results and developing insight about the value of the leads and the effectiveness of the ranking method.

The present disclosure is described in detail with reference to implementations illustrated in the drawings. Other implementations may be used and/or other changes may be made without departing from the spirit or scope of the present disclosure. The illustrative implementations described in the detailed description are not meant to be limiting of the subject matter presented here.

Reference will now be made to the exemplary implementations illustrated in the drawings, and specific language will be used here to describe the same. It will nevertheless be understood that no limitation of the scope of the invention is thereby intended. Alterations and further modifications of the inventive features illustrated and additional applications of the principles of the inventions as illustrated are to be considered within the scope of the invention.

FIG. 1 is a functional block diagram illustrating a system architecture for ranking and appraising leads based on their associated quality. In FIG. 1, system architecture 100 includes one or more client computing devices 102, network connection 104, analytical engine 106, external data sources 108, and internal database 110. Analytical engine 106 further includes ranking module 112 and price modeling module 114.

In FIG. 1, client computing devices 102 are operatively coupled to and in bi-directional communication with network connection 104. Network connection 104 is operatively coupled to and in bi-directional communication with analytical engine 106. Analytical engine 106 is operatively coupled to and in bi-directional communication with external data sources 108. Additionally, analytical engine 106 is operatively coupled to and in bi-directional communication with internal database 110.

In FIG. 1, client computing devices 102 are used by an agent to perform duties associated with leads ranking. In one embodiment, client computing devices 102 include smartphones, desktop computers, laptop computers, servers, tablets, PDAs, single computers with multiple processors, several networked computers, specialized hardware, and the like.

In FIG. 1, network connection 104 is implemented as hardware, software, and/or firmware that interconnects and otherwise couples computing devices to allow effective communication between the aforementioned computing devices. Examples of network connection 104 include intranets, local area networks (LANs), virtual private networks (VPNs), wide area networks (WANs), the Internet, and the like.

In FIG. 1, analytical engine 106 is a collection of components that interact with each other in order to accept requests from agents and give responses accordingly. Analytical engine 106 additionally includes programming running to serve the requests of other programs; the client programs. Thus, the server performs some tasks on behalf of client programs. Examples of client programs running on analytical engine 106 include programs designed and built to retrieve information about a set of leads, assess leads quality, rank leads, carry out analysis, set a floor price for said leads, and provide feedback to an agent through client computing devices 102.

Ranking module 112 is configured to rank a set of leads according to their quality. In some embodiments, ranking module 112 assesses the quality of leads using one or more machine learning techniques. In these embodiments, ranking module 112 is implemented as computer software that includes programmatic rules or logic executed by one or more computing devices. The ranking method is discussed in detail in FIG. 4 and the associated flow diagrams below.

Price modeling module 114 is configured to appraise a set of leads based on a given ranking as well as internal and/or external valuation information. In some embodiments, price modeling module 114 is implemented as computer software that includes programmatic rules or logic executed by one or more computing devices. The appraising method is discussed in detail in FIG. 5 and the associated flow diagrams below.

External data sources 108 is configured to provide potential leads data derived from external channels, such as, websites, social media, networks, and the like. In some embodiments, said potential leads data is employed for profiling leads which are later stored in internal database 110. In these embodiments, external data sources 108 are implemented as computer software that includes programmatic rules or logic Internal database 110 is a relational database that stores information about both the data and how it is related. In these embodiments, internal database 110 is implemented as conventional database management systems (DBMS), such as, MySQL, PostgreSQL, SQLite, Microsoft SQL Server, Microsoft Access, Oracle, SAP, dBASE, FoxPro, IBM DB2, LibreOffice Base, FileMaker Pro, MongoDb and/or any other type of database that may organize collections of data.

In one embodiment, data stored in internal database 110 includes information about a set of leads, previous ranking results, previous leads appraisal results, previous leads auction information, actuarial data related to leads, internal valuation information associated to leads, external valuation information related to leads, and the like. In this embodiment, leads information include a set of attributes for measuring the quality of a lead. In one or more embodiment, leads information is used for automated ranking, where the ranking is based on the quality of the leads under analysis.

Further to these embodiments, the leads appraisal is based on said ranking. In one or more embodiments, the quality of a lead depends on its probability to become a customer and the potential value that said customer may provide to a company.

In an exemplary operation, client computing device 102 allows an agent to request for a leads ranking and appraisal. Upon the agent's request, ranking module 112 retrieves data related to a set of leads. Next, ranking module 112 uses one or more machine learning techniques for assessing the quality of the set of leads and performs one or more operations for ranking the set of leads. In this example, the ranking triages the set of leads into one or more groups. Afterwards, price modeling module 114 defines a floor price for each group of leads based on internal and/or external valuations related to the set of leads.

The computing code running in system architecture 100 includes programs designed and built to rank and appraise leads based on their quality. Said computing code, processes multiple elements simultaneously in multi-processor environments. This allows performing large work, such as heavy calculations and time consuming analysis in a more efficient manner than other approaches such as manual work performed by humans or approaches relying on a single computer. As will become apparent, functions and operations of system architecture 100 are sufficiently complex as to require implementation on a computer system, and cannot be performed in the human mind simply by mental steps.

In one embodiment, the aforementioned computing code is suited for processing multiple elements simultaneously to solve a problem in multi-processor environments. In this embodiment, client computing devices 102 for executing the computing code include a single computer with multiple processors, several networked computers, specialized hardware, or any combination of the aforementioned elements. Further to this embodiment, multi-processor environments include various architectures such as multi-core chips, clusters, field-programmable gate arrays (FPGAs), digital signal processing chips, and/or graphical processing units (GPUs). To this end, the computing code is parallelized for execution in a multi-processor environment including any number or combination of the above listed architecture types. The instruction sets for parallel execution generated from the computing code allows multiple threads of computing code to be executed concurrently by the various computing elements in the multi-processor environment.

Figure 2:
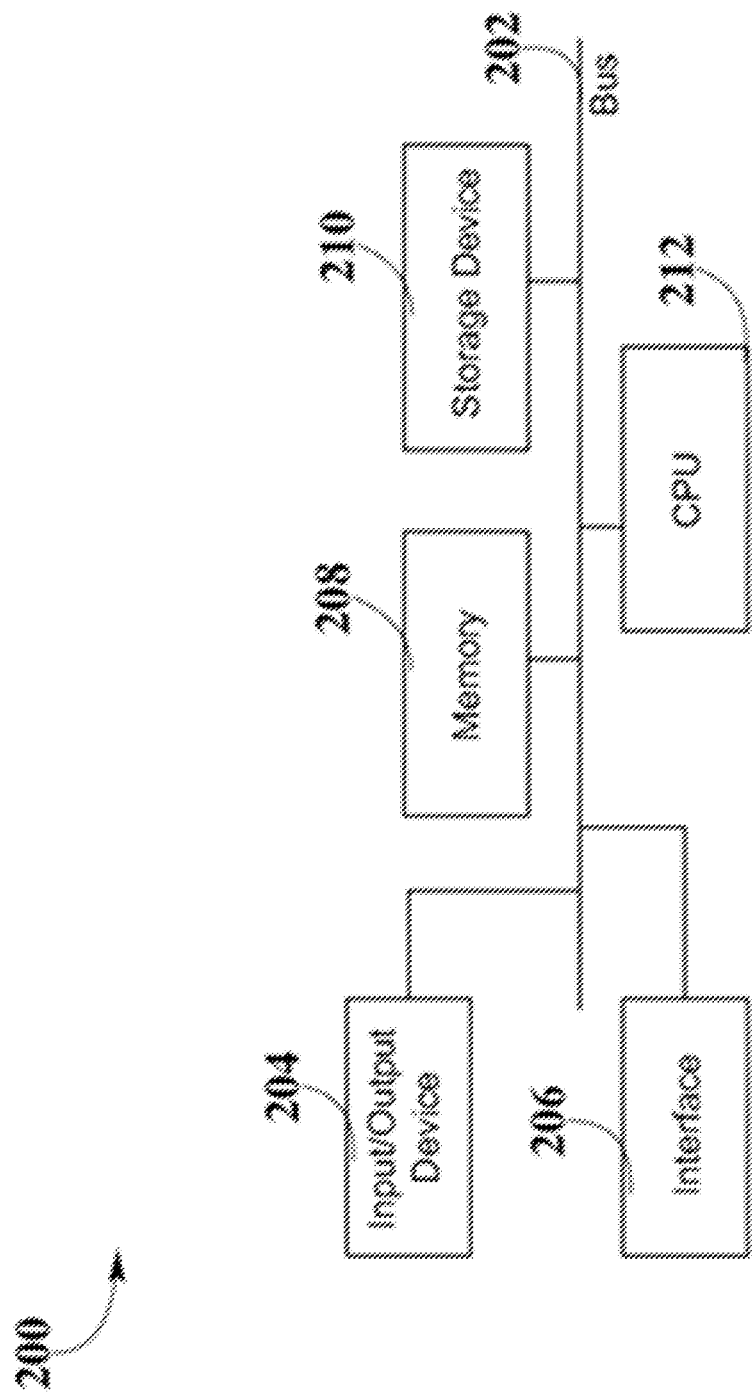
FIG. 2 is a functional block diagram illustrating an exemplary computing device or server in which one or more embodiments of the present disclosure operate, according to an embodiment.

FIG. 2 is an exemplary computing device 200 or server in which one or more embodiments of the implementation operate, according to an embodiment. In one embodiment, computing device 200 includes bus 202, input/output (I/O) device 204, communication interface 206, memory 208, storage device 210 and central processing unit 212. In another embodiment, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanisms that may enable an examiner or candidate to input information to computing device 200, including a keyboard, computer mice, buttons, touch screens, touch-pad, voice recognition, biometric mechanisms, and the like. (I/O) device 204 also includes a mechanism that outputs information to the examiner or candidate using computing device 200, such as, a display, a microphone, a light emitting diode (LED), a printer, a speaker, orientation sensors, and the like. Said orientation sensors include one or more accelerometers, one or more gyroscopes, one or more compasses, and the like. The accelerometer provides a respective change of a respective angle about a respective axis. The gyroscope provides a respective rate of change of a respective angle about a respective axis and the compass provides a compass heading.

Examples of communication interface 206 include mechanisms that enable computing device 200 to communicate with other computing devices and/or systems through network connections. Examples of memory 208 include random access memory 208 (RAM), read-only memory (ROM), flash memory, and the like. Examples of storage device 210 include magnetic and/or optical recording mediums, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, client computing devices 102, or other components of system architecture 100. Examples of these implementations include servers, authorized computing devices, smartphones, desktop computers, laptop computers, tablet computers, PDAs, another type of processor-controlled device that receives, processes, transmits digital data, and the like. Additionally, computing device 200 performs certain operations that are required for the proper operation of the systems and methods described herein. Computing devices 200 perform these operations in response to central processing unit 212 executing software instructions contained in a computer-readable medium, such as memory 208.

In one embodiment, the software instructions of the system are read into memory 208 from another memory location, such as storage device 210, or from another computing device 200 (e.g., client computing devices 102) via communication interface 206. In this embodiment, the software instructions contained within memory 208 instructs central processing unit 212 to perform processes that will be described below in FIGS. 3-5.

Figure 3:
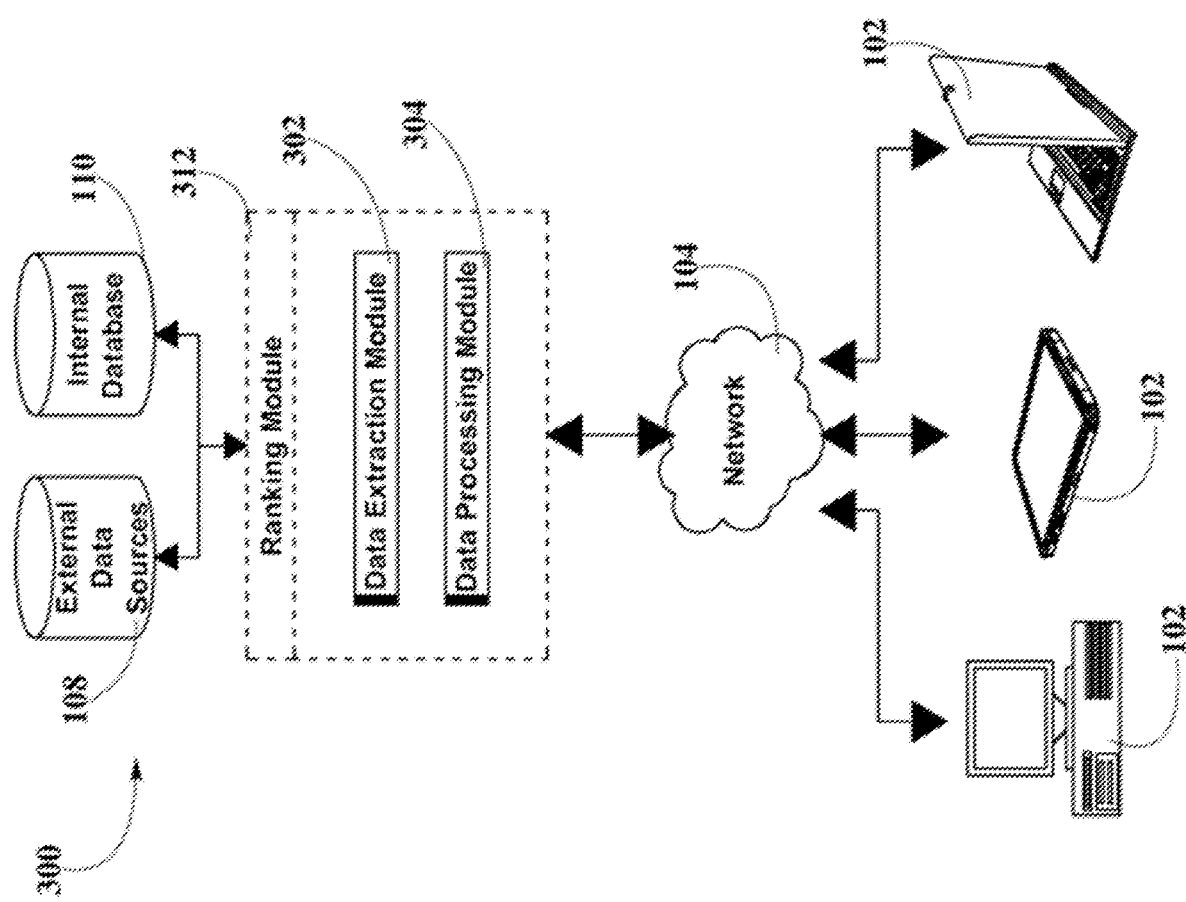
FIG. 3 is a functional block diagram illustrating a system architecture including a sub-system pertaining to a ranking module.

FIG. 3 is a functional block diagram illustrating a system architecture including a sub-system pertaining to a ranking module. In FIG. 3, system architecture 300 includes a sub-system implemented as ranking module 312. In some embodiments, system architecture 300 is implemented as system architecture 100 of FIG. 1, above. In these embodiments, ranking module 312 further includes a data extraction module 302 and a data processing module 304. Although ranking module 312 includes the listed components, it should be understood that ranking module 312 can include less components, more components, or different components depending on the desired analysis goals. In FIG. 3, client computing devices 102 are operatively coupled to and in bi-directional communication with network connection 104. Network connection 104 is operatively coupled to and in bi-directional communication with ranking module 312. Ranking module 312 is operatively coupled to and in bi-directional communication with external data sources 108. Additionally, ranking module 312 is operatively coupled to and in bi-directional communication with internal database 110.

In one embodiment, ranking module 312 analyzes data, assesses leads quality, and ranks said leads based on their quality. In this embodiment, data extraction module 302 retrieves information related to a set of leads from internal database 110. Said data is then examined by data processing module 304 which performs one or more operations for ranking the set of leads. In one or more embodiments, ranking module 312 is implemented as one or more computer software modules executed by one or more computing devices. Further to these embodiments, the results derived from ranking module 312 are presented through client computing device 102, where client computing device 102 previously requested the ranking of the set of leads. In some embodiments, ranking module 312 stores the ranking results to be available for further study.

Data extraction module 302 is configured to retrieve data regarding a set of leads, where said data is stored in internal database 110. The data includes leads attributes such as, economic stability, credit card usage, liquid assets, education level, discretionary spending, retirement assets, and the like. Next, data extraction module 302 feeds data processing module 304 with the data retrieved.

In one embodiment, data processing module 304 is configured to rank leads based on their quality. In this embodiment, data processing module 304 assesses the quality of each lead using one or more machine learning algorithms. Further to this embodiment, data processing module 304 performs one or more operations for ranking the leads under analysis.

In an exemplary operation, given a request for ranking a set of leads, data extraction module 302 retrieves a set of attributes associated with the set of leads. Said attributes include credit card usage, liquid assets, and discretionary spending. Next, data processing module 304 assesses the quality of each lead, where the quality of each lead depends on the potential of said lead to become a customer and create value for a company. Afterwards, data processing module 304 ranks the set of leads according to a quality criterion. In this example, the results derived from data processing module 304 are presented to an agent through client computing device 102.

Figure 4:
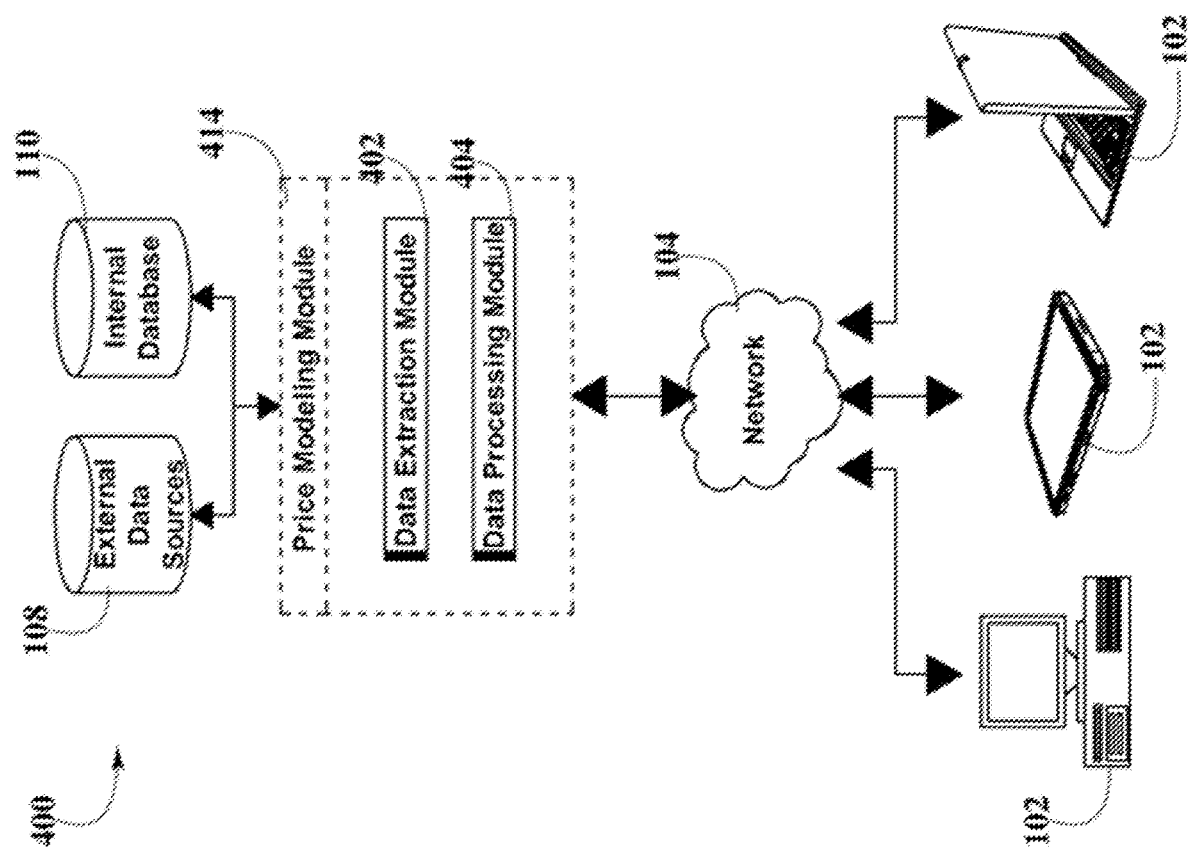
FIG. 4 is a functional block diagram illustrating a system architecture including another sub-system pertaining to a price modeling module.

FIG. 4 is a functional block diagram illustrating a system architecture including a sub-system pertaining to a price modeling module. In FIG. 4, system architecture 400 includes a sub-system implemented as price modeling module 414. In some embodiments, system architecture 400 is implemented as system architecture 100 of FIG. 1, above. In these embodiments, price modeling module 414 further includes a data extraction module 402 and a data processing module 404. Although price modeling module 414 includes the listed components, it should be understood that price modeling module 414 can include less components, more components, or different components depending on the desired analysis goals. In FIG. 4, client computing devices 102 are operatively coupled to and in bi-directional communication with network connection 104. Network connection 104 is operatively coupled to and in bi-directional communication with price modeling module 414. Price modeling module 414 is operatively coupled to and in bi-directional communication with external data sources 108. Additionally, price modeling module 414 is operatively coupled to and in bi-directional communication with internal database 110.

In one embodiment, price modeling module 414 is configured to appraise leads based on a given ranking. In this embodiment, data extraction module 402 retrieves information related to a set of leads from internal database 110. Said data is then examined by data processing module 404 which defines a floor price for the set of leads. In some embodiments, price modeling module 414 is implemented as one or more computer software modules executed by one or more computing devices. Further to these embodiments, the results derived from price modeling module 414 are presented through client computing device 102, where client computing device 102 previously requested a ranking and/or appraisal of the set of leads. In some embodiments, price modeling module 414 stores the appraisal result to be available for further study.

In some embodiments, data extraction module 402 is configured to retrieve data from internal database 110. The data retrieved includes a leads ranking, internal valuation information, and external valuation information associated with the set of leads.

In one embodiment, data processing module 404 is configured to perform a leads appraisal based on a given ranking, internal valuation information, and external valuation information related to a set of leads. In this embodiment, internal valuation information is derived based on the company's standards and actuarial data associated to the set of leads. Further to this embodiment, external valuation information is derived from previous auctions. In one or more embodiments, the ranking triages the set of leads into a plurality of groups. In these embodiments, data processing module 404 defines a floor price for each group of leads. Examples of floor price include a reserve price, a starting bid price, a fixed sale price, highest bids derived from previous auctions, and the like.

In an exemplary operation, given a request for leads appraisal, data extraction module 402 retrieves information associated with a set of leads. Said information includes a ranking associated to the set of leads as well as internal and external valuations of the set of leads. In this example, the set of leads is triaged into five categories. Further to this example, data processing module 404 sets a floor price for each category of the ranking. In this example the floor price is represented by a reserve price.

A plurality of methods implemented by analytical engine 106 and its associated modules are performed by one or more computing devices, such as, computing device 200. The methods are implemented using components of the exemplary operating environments of FIGS. 1-4. The steps of this exemplary method are embodied in a computer readable medium containing a computer readable code such that the steps are implemented when the computer readable code is executed by a computing device. While the blocks in the disclosed process are shown in a particular order, the actual order may differ. In some embodiments, some steps are performed in parallel.

Figure 5:
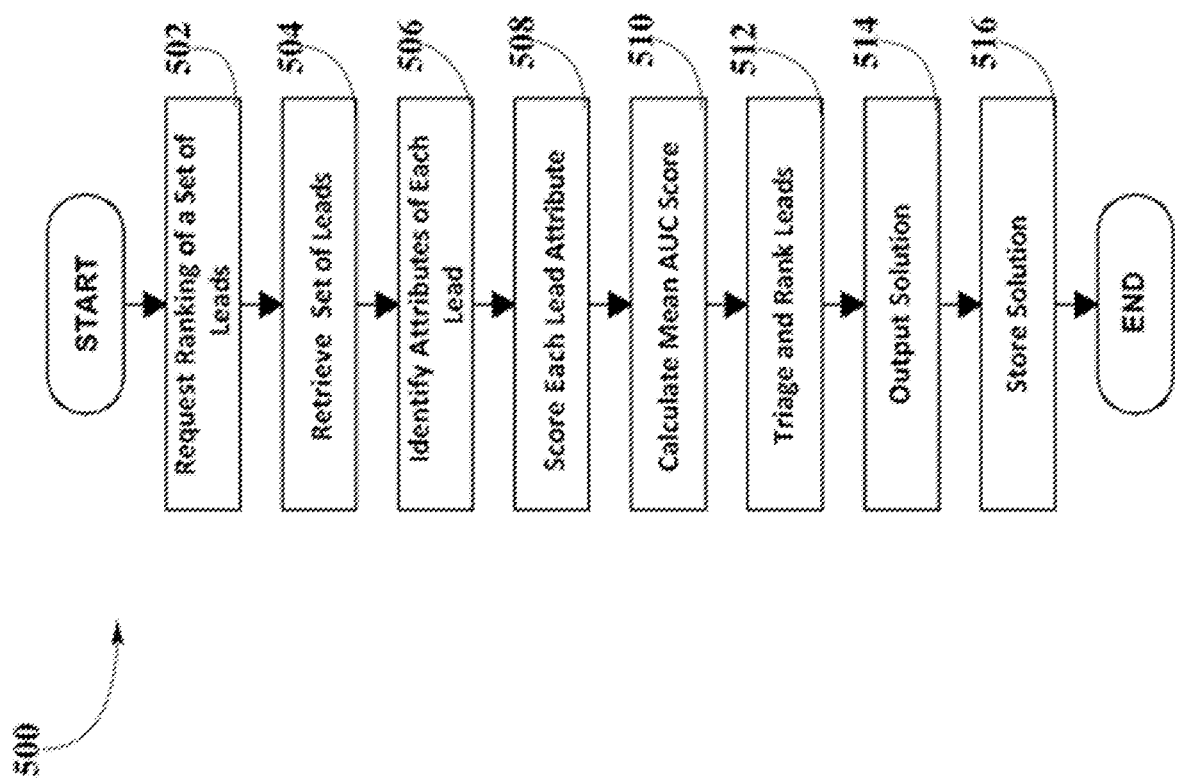
FIG. 5 is a flow diagram generally illustrating an exemplary method for ranking leads based on their associated quality.

FIG. 5 is a flow diagram generally illustrating an exemplary method for analyzing a set of attributes related to a set of leads and performing a ranking based on the quality of said leads. The steps of the method are implemented with components of the exemplary operating environments of FIGS. 1-4. The steps of this exemplary method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 5 method 500 begins at step 502, where a client computing device requests a ranking of a set of leads. In one embodiment, the request is performed by an agent using the aforementioned computing device. Method 500 then advances to step 504.

At step 504, a ranking module employs a data extraction module for retrieving a set of leads from an internal database. In one or more embodiments, each lead includes a set of attributes that is employed for measuring its quality. In these embodiments, the attributes include information such as economic stability, credit card usage, liquid assets, education level, discretionary spending, and retirement assets, and the like. Further to these embodiments, the quality of a lead varies depending on its potential to become a customer and the potential to create value for a company. Method 500 then advances to step 506.

At step 506, the ranking module identifies the attributes of each lead. In one embodiment, the ranking module identifies the attributes of each lead using one or more software functions. In this embodiment, the ranking module stores the data in one or more variables for further analysis in a data processing module. Method 500 then advances to step 508.

At step 508, the data processing module computes a score for each leads attribute based on the company's internal standards. In one embodiment, the scores' domain varies depending on the attribute under analysis. In this embodiment, said domains range from 1 to 30. Further to this embodiment, attributes related to income level and financial assets do not need a score calculated as they are expressed by a quantitative value representing a specific dollar amount. Method 500 then advances to step 510.

At step 510, the data processing module calculates a mean area under the receiver operator curve (AUC) score. In one embodiment, said calculation is performed using machine learning techniques such as naive bayes, logistic regression, support vector machine and random forest, and the like. In this embodiment, the mean AUC score describes the quality of a lead by representing the likelihood of a lead for converting into a customer. Method 500 then advances to step 512.

At step 512, the data processing module triages and ranks the set of leads according to their mean AUC score. Method 500 then advances to step 514.

At step 514, the ranking module presents the ranking solution to the agent through the client computing device. In one embodiment, the ranking solution presents the set of leads ranked and classified into different levels of priority. Method 500 then advances to step 516.

At step 516, the ranking module stores the ranking solution into an internal database. In one embodiment, the ranking solution stored may be employed by other modules operating within a systems' architecture configured to rank and auction leads to agents. Further to this embodiment, the ranking solutions are used for tracking results and developing insight about the value of leads and the effectiveness of the ranking method.

Figure 6:
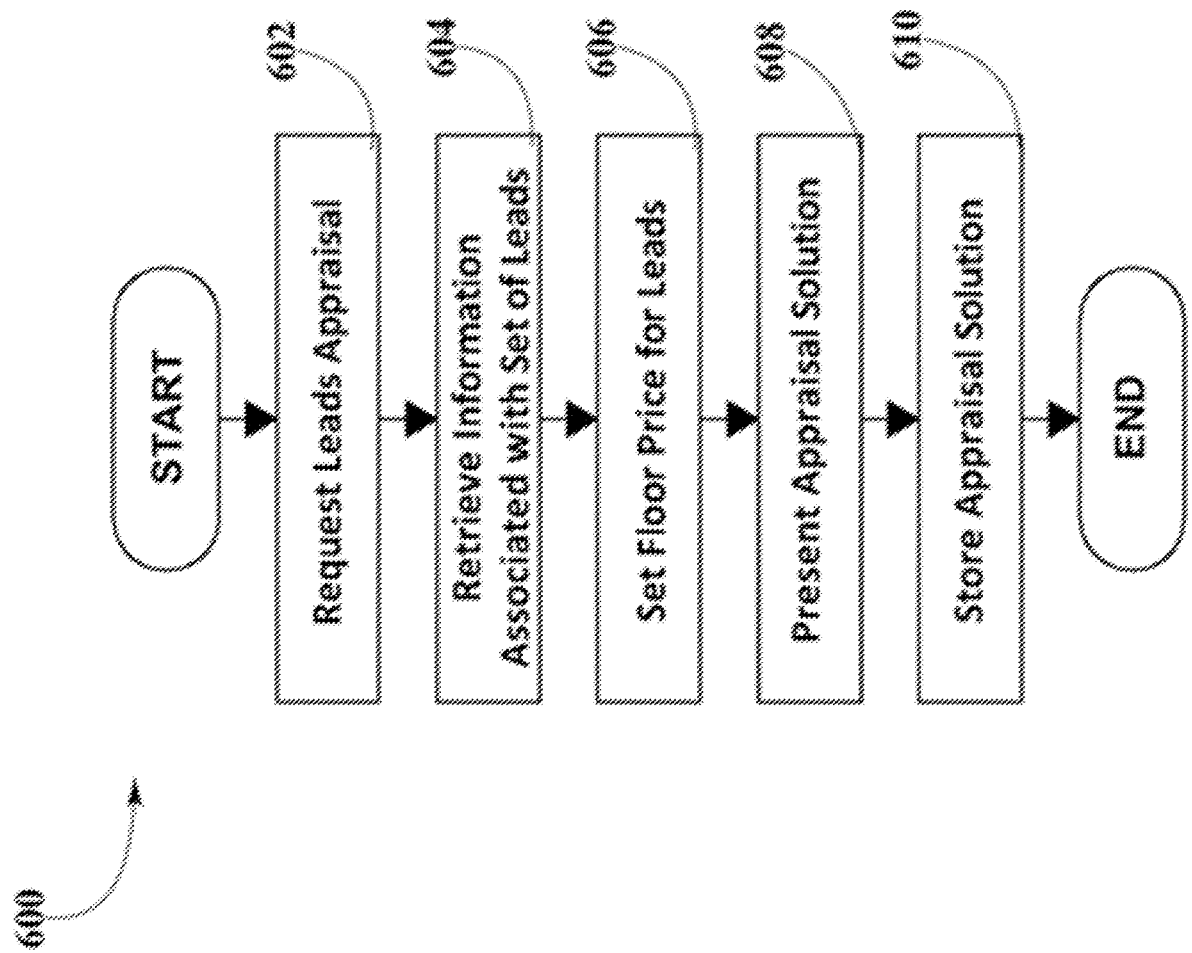
FIG. 6 is a flow diagram generally illustrating an exemplary method for leads appraisal based on an associated ranking.

FIG. 6 is a flow diagram generally illustrating an exemplary method for leads appraisal based on an associated ranking. The steps of the method are implemented with components of the exemplary operating environments of FIGS. 1-4. The steps of this exemplary method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 6 the method 600 begins at step 602, where a client computing device requests a leads appraisal. In one embodiment, the request is performed by an agent using the aforementioned computing device. Method 600 then advances to step 604.

At step 604, an analytical engine employs a data extraction module for retrieving information related to a set of leads. In one or more embodiments, said information includes a ranking, internal valuation data, and external valuation data associated with a set of leads. In these embodiments, said ranking includes a triage grouping the set of leads based on a mean area under the receiver operator curve (AUC) score. Further to these embodiments, the ranking, the internal valuation data, and the external valuation data are retrieved from an internal database. Method 600 then advances to step 606.

At step 606, a pricing module sets a floor price for each group of leads (where each group is defined by the ranking). In one embodiment, the floor price set to each group of leads is defined based on internal valuations as well as external valuations. In this embodiment, the external valuations are derived from previous auctions. Further to this embodiment, the internal valuations are derived from actuarial data related to each group of leads as well as the company's standards. Examples of floor price include a reserve price, a starting bid price, a fixed sale price, highest bids derived from previous auctions, and the like. Method 600 then advances to step 608.

At step 608, the analytical engine presents the appraisal solution to the agent through the client computing device. In one embodiment, the appraisal solution derived from the analytical engine presents the set of leads ranked and triage into one or more groups, where each group has associated a floor price. Method 600 then advances to step 610.

At step 610, the price modeling module stores the appraisal solution into an internal database. In one embodiment, the appraisal solution stored is employed by other modules operating within a systems' architecture configured to rank and auction leads to agents. Further to this embodiment, the appraisal solutions are used for tracking results and developing insight about the value of leads.

By executing method 500 and method 600 through the exemplary operating environments shown in FIGS. 1-4, big data analytics and data mining techniques can be implemented for a more efficient and faster processing of larger data sets. In this way, efficiencies are created by providing ways to automatically determine the quality of a set leads, performing a ranking according to said quality, and determining a floor price based on the leads ranking. These features allow performing large work such as heavy calculations and time consuming analysis in a more efficient manner than other approaches such as manual work performed by humans.

The foregoing method descriptions and the interface configuration are provided merely as illustrative examples and are not intended to require or imply that the steps of the various implementation must be performed in the order presented. The steps in the foregoing implementations may be performed in any order. Words such as "then," "next," etc. are not intended to limit the order of the steps. These words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, and/or a subprogram, among others. When a process corresponds to a function, its termination may correspond to a return of the function to the calling function and/or the main function.

The various illustrative logical blocks, modules, circuits, and algorithm steps described in connection with the implementations disclosed here may be implemented as electronic hardware, computer software, or combinations of both. To clearly illustrate this interchangeability of hardware and software, various illustrative components, blocks, modules, circuits, and/or steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be applied in software, firmware, middleware, microcode, hardware description languages, and/or any combination thereof. A code segment or machine-executable instructions may represent a procedure, a function, a subprogram, a program, a routine, a subroutine, a module, a software package, a class, and/or any combination of instructions, data structures, and/or program statements. A code segment may be coupled to another code segment or a hardware circuit by passing and/or receiving information, data, arguments, parameters, or memory contents. Information, arguments, parameters, and/or data, among others, may be passed, forwarded, and/or transmitted via memory sharing, message passing, token passing, network transmission, etc.

The actual software code and/or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, Blu-ray discs, disks which reproduce data magnetically, discs which reproduce data optically with lasers, and/or any other disks. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed implementations is provided to enable any person skilled in the art to make or use the present invention. Various modifications to these implementations will be readily apparent to those skilled in the art, and the generic principles defined here may be applied to other implementations without departing from the spirit or scope of the invention. Thus, the present invention is not intended to be limited to the implementations shown here but is to be accorded the widest scope consistent with the following claims and the principles and novel features disclosed here.

What is claimed is:

1. A server-implemented method comprising:
periodically scanning, by a server, one or more databases to extract lead information associated with a set of leads;
upon receiving a lead attribute from a computer of an agent, filtering, by the server, the lead information to obtain a set of filtered lead information comprising a first subset of leads from the set of leads containing the lead attribute;
executing, by the server, a machine-learning model to calculate a score for each lead within the subset of leads based on a learning dataset comprising the lead information, the score corresponding to a likelihood of each lead converting to a customer;
periodically querying, by the server, the one or more databases to receive modified data associated with each lead;
iteratively updating, by the server, the learning dataset of the machine-learning model based on the modified data associated with each lead, wherein the machine-learning model is configured to use an updated learning dataset each time the machine-learning model is executed after the learning dataset is updated;
determining, by the server, a second subset of leads from the first subset of leads having the score that satisfies a threshold; and
calculating, by the server, a minimum auction price for the second subset of leads based on previous auctions;
updating, by the server, a graphical user interface of a computer of an agent with the minimum auction price and ranking information associated with the second subset of leads, wherein each lead of the second subset of leads is ranked based on their corresponding score.

2. The server-implemented method of claim 1, further comprising determining, by the server, the second subset of leads from the first subset of leads that imply a highest potential value of each lead based on their corresponding score.

3. The server-implemented method of claim 2, further comprising triaging, by the server, each ranked lead of the second subset of leads that imply the highest potential value of each lead based on the score.

4. The server-implemented method of claim 1, wherein the machine-learning model utilizes a naive bayes technique to calculate the score for each lead.

5. The server-implemented method of claim 1, wherein the machine-learning model utilizes a support vector machine to calculate the score for each lead.

6. The server-implemented method of claim 1, wherein the machine-learning model utilizes a random forest technique to calculate the score for each lead.

7. The server-implemented method of claim 1, wherein the machine-learning model utilizes a logistic regression technique to calculate the score for each lead.

8. The server-implemented method of claim 1, further comprising scanning, by the server, one or more social networking web documents associated with the set of leads within the one or more databases.

9. The server-implemented method of claim 8, further comprising extracting, by the server, the lead information from the one or more social networking web documents.

10. The server-implemented method according to claim 9, wherein the lead information comprises at least one of: identity, age, ethnicity, place of residence, number of dependent persons, identity of dependent persons, expenditure, savings, approximate market value of assets and their composition, education, professional situation, contact information, shopping preferences, travel preferences, hobbies, social activities, active lifestyle, online behavioral patterns, medical and health records.

11. A system comprising:
a server configured to:
periodically scan one or more databases to extract lead information associated with a set of leads;
upon receiving a lead attribute from a computer of an agent, filter the lead information to obtain a set of filtered lead information comprising a first subset of leads from the set of leads containing the lead attribute;
execute a machine-learning model to calculate a score for each lead within the subset of leads based on a learning dataset comprising the lead information;
periodically query the one or more databases to receive modified data associated with each lead;
iteratively update the learning dataset of the machine-learning model based on the modified data associated with each lead, wherein the machine-learning model is configured to use an updated learning dataset each time the machine-learning model is executed after the learning dataset is updated;
determine a second subset of leads from the first subset of leads having the score that satisfies a threshold; and
calculate a minimum auction price for the second subset of leads based on previous auctions;
update a graphical user interface of a computer of an agent with ranking information associated with the second subset of leads, wherein each lead of the second subset of leads is ranked based on their corresponding score.

12. The system of claim 11, wherein the server is further configured to determine the second subset of leads from the first subset of leads that imply a highest potential value of each lead based on their corresponding score.

13. The system of claim 12, wherein the server is further configured to triage each ranked lead of the second subset of leads that imply the highest potential value of each lead based on the score.

14. The system of claim 11, wherein the machine-learning model utilizes a naive bayes technique to calculate the score for each lead.

15. The system of claim 11, wherein the machine-learning model utilizes a support vector machine to calculate the score for each lead.

16. The system of claim 11, wherein the machine-learning model utilizes a random forest technique to calculate the score for each lead.

17. The system of claim 11, wherein the machine-learning model utilizes a logistic regression technique to calculate the score for each lead.

18. The system of claim 11, wherein the server is further configured to scan one or more social networking web documents associated with the set of leads within the one or more databases.

19. The system of claim 18, wherein the server is further configured to extract the lead information from the one or more social networking web documents.

20. The system according to claim 19, wherein the lead information comprises at least one of: identity, age, ethnicity, place of residence, number of dependent persons, identity of dependent persons, expenditure, savings, approximate market value of assets and their composition, education, professional situation, contact information, shopping preferences, travel preferences, hobbies, social activities, active lifestyle, online behavioral patterns, medical and health records.

\* \* \* \* \*